United States Patent Office — 3,004,973 — Patented Oct. 17, 1961

1

3,004,973
NEW TETRAHYDRO-DIOXOPYRIDAZINES
Jean Druey and Konrad Meier, Riehen, and Alexander Staehelin, Basel, Switzerland, assignors to Ciba Pharmaceutical Products Inc., Summit, N.J.
No Drawing. Filed May 7, 1958, Ser. No. 733,471
Claims priority, application Switzerland May 24, 1957
14 Claims. (Cl. 260—250)

This invention relates to new 3:6-dioxo-1:2:3:6-tetrahydro-pyridazine compounds and methods for preparing same. More particularly the invention concerns 1-aryl-3:6-dioxo-1:2:3:6-tetrahydro-pyridazines containing in 2-position a low aliphatic hydrocarbon radical and in one of the positions 4 and 5 an etherified hydroxyl or mercapto group, preferably an aliphatic etherified hydroxyl or mercapto group. The aryl radicals include especially at the most binuclear aromatic radicals, such as naphthyl, but preferably phenyl, which may also contain substituents, such as low alkyl or alkoxy groups, for example, methyl ethyl, methoxy, ethoxy, halogen atoms, such as chlorine or bromine, or nitro or amino groups. Low aliphatic hydrocarbon radicals are preferably low alkyl radicals, such as methyl or ethyl. The etherified hydroxyl or mercapto group can be etherified for example cycloaliphatically, araliphatically or heterocycloaliphatically, can be for instance a benzyloxy group. The hydroxyl or mercapto is, however, preferably aliphatically etherified. Aliphatic radicals are more especially low unsubstituted or substituted aliphatic hydrocarbon radicals, such as methyl, ethyl, propyl, allyl, propargyl, butyl, amyl or hexyl groups. Substituents of the hydrocarbon radicals are preferably free or etherified hydroxyl groups, such as low alkoxy groups, for example, methoxy, ethoxy or propoxy, free or substituted amino groups, such as amino groups, mono- or disubstituted for example by low hydrocarbon radicals, aza-or oxa-hydrocarbon radicals, for example methylamino, dimethylamino, diethylamino, dipropylamino, N-methyl-N-cyclopentylamino, morpholino, pyrrolidino, piperidino, piperazino, N-methylpiperazino, N-(β-hydroxyethyl)-piperazino groups, or halogen atoms, such as chlorine or bromine.

The new dioxopyridazines can contain in addition to the etherified hydroxyl group in 4- or 5-position also a further substituent in 5- or 4-position, preferably a low aliphatic hydrocarbon radical, such as a low alkyl radical, for example methyl.

The new compounds possess sedative-hypnotic activity and can therefore be used as medicaments or as intermediates for the production of medicaments of this type of action.

Of particular value, and therefore constituting a preferred and specific embodiment of the invention, are dioxopyridazines of the formula

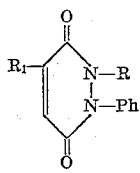

in which R stands for a low alkyl radical, for example methyl or ethyl, $R_1$ represents a low alkoxy group, preferably one having 1–5 carbon atoms, above all a propoxy or butoxy radical, and Ph stands for an unsubstituted phenyl radical or a phenyl radical/substituted by halogen or low alkyl, particularly a chlorine or methylphenyl radical, such as 1-phenyl-2-methyl-4-ethoxy-3:6-dioxo-1:2: 3:6-tetarahydropyridazine, above all 1-phenyl-2-methyl-4-n-propoxy-3:6-dioxo-1:2:3:6-tetrahydropyridazine, 1-phenyl-2-methyl-4-n-butoxy-3:6-dioxo-1:2:3:6-tetrahydropyridazine, 1-phenyl-2-ethyl-4-n-butoxy-3:6-dioxo-1:2:3:6-tetrahydropyridazine, 1-p-chlorophenyl-2-methyl-4-n-butoxy-3:6-dioxo-1:2:3:6-tetrahydropyridazine, 1-p-chlorophenyl-2-methyl-4-n-propoxy-3:6-dioxo-1:2:3:6-tetrahydropyridazine and 1-p-tolyl-2-methyl-4-n-propoxy-3:6-dioxo-1:2:3:6-tetrahydropyridazine.

The new compounds are obtained by various processes. Thus one process consists in that 1-aryl-3:6-dioxo-1:2: 3:6-tetrahydropyridazines, containing in 2-position a low aliphatic hydrocarbon radical and in 4- or 5-position a chlorine or bromine atom, are treated with an alcohol or mercaptan, preferably in the presence of a basic condensing agent, e.g. a tertiary organic amine such as triethylamine. The alcohol or the mercaptan can also be used in the form or presence of the corresponding alcoholates or mercaptides, for example alkali metal alcoholates or mercaptides. In this reaction, independent of the position of the halogen atom in the starting material, the alcohol or mercaptan radical enters the 4-position.

A further process consists in that into 2-unsubstituted 1-aryl-3:6-dioxo-1:2:3:6-tetrahydropyridazines, containing in 4- or 5-position an etherified hydroxyl group or mercapto group, a low aliphatic hydrocarbon radical is introduced in 2-position. For this purpose, for example, these compounds can be treated with corresponding sulfuric acid diesters, preferably in a neutral or acid medium.

As sulfuric acid diesters there are chiefly concerned dimethyl and diethyl sulfate. The reaction is preferably carried out at elevated temperature, for example between 100 and 200° C., in the presence or absence of diluents, condensing agents or catalysts, in an open vessel or in a closed vessel under pressure.

The 1-aryl-4- or -5-halogeno-3:6-dioxo-1:2:3:6-tetrahydropyridazines, containing in 2-position a low aliphatic hydrocarbon radical, which are used as starting materials, are obtained by the introduction of a low aliphatic hydrocarbon radical into the 2-position of the corresponding 2-unsubstituted compounds, for example by treatment of the 2-unsubstituted compounds with corresponding sulfuric acid diesters and isolation of the 2-substituted product produced. In a surprising manner, 5-halogen compounds of this type can also be obtained from the corresponding 1-aryl-4:5-dihalogeno-3:6-dioxo-1:2:3:4:5:6-hexahydro-pyridazines, which contain in 2-position a low aliphatic hydrocarbon radical, by reaction with agents splitting off hydrogen halide, preferably strong organic bases, for example tertiary amines, especially pyridine. When alcoholates are used or alcohols in the presence of a basic condensing agent as agents for splitting off hydrogen halide, then in the same reaction the introduction of the ether-group in 4-position can already be effected with elimination of the remaining halogen atom.

1-aryl-4:5-dihalogeno-3:6-dioxo-1:2:3:4:5:6-hexahydro-pyridazines, containing in 2-position a low aliphatic hydrocarbon radical, are obtained by adding on halogen to corresponding 1-aryl-3:6-dioxo-1:2:3:6-tetrahydropyridazines. The other starting materials are known or can be prepared by methods of known type.

Starting materials used in the described processes can also be obtained during the main reaction itself. Thus it is possible, for example, to react a 1-aryl-4:5-dihalogeno-3:6-dioxo-1:2:3:4:5:6-hexahydropyridazine containing in 2-position a low aliphatic hydrocarbon radical, the halogen atoms being chlorine or bromine as mentioned above, with an alcoholate or an alcohol in the presence of a strongly basic tertiary amine, as a result of which in the first place splitting off of hydrogen halide takes place with the formation of the corresponding 5-halogen-3:6-dioxo-1:2:3:6-tetrahydropyridazine which then further reacts with the alcoholate or alcohol in the manner set forth above. Moreover, it is also possible, for reaction with the sulfuric acid diesters, to use instead of the 1-aryl-3:6-dioxo-1:2:3:6-tetrahydropyridazines, containing in 4- or 5-position an etherified hydroxyl group, corresponding 3-enol ethers or acylates, from which under the reaction conditions probably the 3:6-dioxo-1:2:3:6-tetrahydropyridazines are intermediately produced.

When the new compounds contain basic groups they can be obtained in the form of the free bases or their salts. Free bases can be converted into their salts by reaction with acids suitable for the formation of therapeutically useful salts. Such acids are for example, hydrohalic acids, sulfuric acids, nitric acid, perchloric acid, phosphoric acid, formic acid, acetic acid, propionic acid, lactic acid, oxalic acid, succinic acid, malic acid, tartaric acid, citric acid, ascorbic acid, methane-sulfonic acid, ethane-sulfonic acid, hydroxyethane sulfonic acid, benzoic acid, salicylic acid, para-aminosalicylic acid, toluenesulfonic acid or naphthalene sulfonic acid. Resulting salts can be converted into the free bases in the ordinary manner. Resulting tertiary amines can be quaternated in a manner known per se, for example by treatment with a reactive ester of an alkanol or benzyl-alcohol, such as an alkyl halide, sulfate or sulfonate. The quaternary ammonium salts can be converted into the free ammonium hydroxides from which other salts, for example those of the above mentioned acids, can be prepared. The direct conversion of resulting quaternary ammonium salts into other salts can also be carried out in the usual manner.

The new 1-aryl-3:6-dioxo-1:2:3:6-tetrahydropyridazines substituted in 2-position, containing in 4- or 5-position a low aliphatic etherified hydroxyl or mercapto group, can be used, for example, in the form of pharmaceutical preparations containing them in admixture with a pharmaceutical organic or inorganic carrier material suitable for enteral or parenteral administration. For the production of such preparations such substances are concerned as do not react with the new compounds, for example water, gelatine, lactose, starch, magnesium stearate talc, vegetable oils, benzyl alcohols, gums, polyalkylene glycols, or other known medicament carriers. The pharmaceutical preparations can, for example, take the form of tablets, dragees, or liquid form as solutions, suspensions or emulsions. If desired they are sterilized and/or contain auxiliary substances, such as preserving, stabilizing, wetting or emulsifying agents, salts for variation of the osmotic pressure or buffer substances. They can also contain other therapeutically valuable materials, for example antibacterial or antivirus substances.

The following examples illustrate the invention.

*Example 1*

5 grams of 1-phenyl-3:5-dimethoxy-6-oxo-1:6-dihydropyridazine are heated with 15 cc. of dimethyl sulfate for 4 hours to 150–160° C. in an oil bath. The mixture is hydrolyzed at room temperature with 150 cc. of saturated sodium carbonate solution and 100 cc. of water and the transformation product extracted with chloroform. After drying the extract and distilling off the chloroform, the crystalline residue is recrystallized from acetone. The resulting 1-phenyl-2-methyl-5-methoxy-3:6-dioxo-1:2:3:6-tetrahydropyridazine of the formula

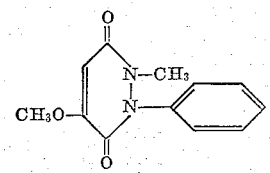

melts at 157–157.5° C.

The 1-phenyl-3:5-dimethoxy-6-oxo-1:6-dihydropyridazine used as starting material can be prepared as follows:

24.1 grams of 1-phenyl-3:5-dichloro-6-oxo-1:6-dihydropyridazine are heated for 16 hours to 120–130° C. with a solution of 5 grams of sodium in 300 cc. of absolute methanol. The methanol is then distilled off and the residue treated with water and extracted with methylene chloride. After drying of the extract and distilling off the methylene chloride, the remaining crystalline residue is recrystallized from methanol. The resulting 1-phenyl-3:5-dimethoxy-6-oxo-1:6-dihydro-pyridazine forms colorless, lustrous leaflets of M.P. 137–137.5° C.

*Example 2*

0.6 gram of 1-phenyl-5-methoxy-3:6-dioxo-1:2:3:6-tetrahydropyridazine is heated with 6 cc. of dimethyl sulfate for 4 hours to 140–145° C. After cooling, the mixture is stirred with 40 cc. of saturated sodium carbonate solution and 40 cc. of water until the dimethyl sulfate is hydrolyzed. The clear solution is extracted several times with chloroform and the chloroform solution dried and evaporated. The residue, when recrystallized from methanol, gives colorless crystals of the 1-phenyl-2-methyl-5-methoxy-3:6-dioxo-1:2:3:6 - tetrahydropyridazine described in Example 1.

The 1-phenyl-5-methoxy-3:6-dioxo-1:2:3:6-tetrahydropyridazine used as starting material can be prepared as follows:

3.5 gram of 1-phenyl-5-chloro-3:6-dioxo-1:2:3:6-tetrahydropyridazine are heated in a tube for 12 hours to 120–130° C. with a solution of 1 gram of sodium in 100 cc. of methanol. The methanol is distilled off, the residue acidified with hydrochloric acid, the crystalline crude product filtered with suction and recrystallized from methanol. The resulting 1-phenyl-5-methoxy-3:6-dioxo-1:2:3:6-tetrahydropyridazine crystallizes in colorless prisms of M.P. 240–243° C.

*Example 3*

2.8 grams of 1-phenyl-2-methyl-4-chloro-3:6-dioxo-1:2:3:6-tetrahydropyridazine are heated on the water bath in 50 cc. of methanol and treated dropwise with a solution of 0.55 gram of sodium in 50–65 cc. of methanol. After 3 hours the methanol is distilled off, the residue treated with water and the alkaline solution extracted by shaking with chloroform. The chloroform solution is dried and completely evaporated. The yellow residue is crystallized from benzene/cyclohexane and in this manner 1-phenyl-2-methyl-4-methoxy-3:6-dioxo-1:2:3:6-tetrahydro-pyridazine of the formula

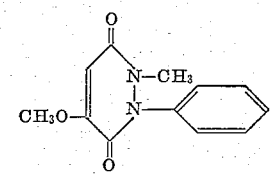

obtained in the form of white needles of M.P. 117–118° C.

The 1 - phenyl-2-methyl-4-chloro-3:6-dioxo - 1:2:3:6-tetrahydropyridazine used as starting material can be obtained as follows:

10 grams of 1-phenyl-4-chloro-3:6-dioxo-1:2:3:6-tetrahydropyridazine are heated with 25 cc. of dimethyl sulfate for 3½ hours to 140–150° C. The brown solution is cooled and poured into 150 cc. of a saturated sodium carbonate solution and the whole diluted with 100 cc. of water. The solution is stirred for some time and then extracted by shaking with chloroform. The chloroform extract is dried and evaporated. The residue is dissolved in benzene and the solution filtered through aluminum oxide and evaporated. The residue is recrystallized from ethyl acetate. In this manner 1-phenyl-2-methyl-4-chloro-3:6-dioxo-1:2:3:6 - tetrahydropyridazine is obtained in weakly yellow crystals of M.P. 150–152° C.

*Example 4*

5 grams of 1-phenyl-4-methoxy-3:6-dioxo-1:2:3:6- tetrahydropyridazine are heated in 10 cc. of dimethyl sulfate for ½ hour to 145–155° C. The solution is cooled and poured into a saturated sodium carbonate solution (about 100 cc.). After stirring for 2 hours at room temperature, the alkaline solution is extracted with chloroform. The dried organic phase is then evaporated and the brown residue extracted by boiling with petroleum ether. The insoluble fraction is recrystallized from ethyl acetate. The 1-phenyl-2-methyl-4-methoxy-3:6-dioxo-1:2:3:6-tetrahydro-pyridazine described in Example 3 is thus obtained.

The petrol ether solution is evaporated and the residue recrystallized from ethyl acetate. In this manner the isomeric 1-phenyl-3:4-dimethoxy-pyridazone-(6) is isolated in white crystals of M.P. 152–154° C.

The 1-phenyl-4-methoxy-3:6-dioxo-1:2:3:6-tetrahydropyridazine used as starting material can be obtained as follows:

23 grams of 1-phenyl-4-chloro-3:6-dioxo-1:2:3:6-tetrahydropyridazine are heated to boiling under reflux in 300 cc. of methanol and treated dropwise with a solution consisting of 9.2 grams of sodium in 200 cc. of methanol. The mixture is heated for a further 8 hours to boiling then treated with water and the methanol distilled off. The alkaline solution is filtered over animal charcoal and the still warm solution acidified with glacial acetic acid. The deposited crystals are filtered with suction, washed with water and recrystallized from ethanol.

In this manner the 1-phenyl-4-methoxy-3:6-dioxo-1:2:3:6-tetrahydropyridazine is obtained in the form of white crystals of M.P. 260–262° C. (with decomposition).

Example 5

5 grams of 1-phenyl-2-methyl-5-chloro-3:6-dioxo-1:2:3:6-tetrahydropyridazine are dissolved in the hot in 50 cc. of methanol and with stirring treated dropwise with a solution of 0.55 gram of sodium in 50 cc. of methanol. The reddish solution is heated for 2½ hours on the water bath, then treated with water and the methanol distilled off. The solution is rendered alkaline and extracted by shaking with chloroform. The dried organic phase is evaporated and the remaining oily residue recrystallized from ethyl acetate/petroleum ether. In this manner there is obtained the 1-phenyl-2-methyl-4-methoxy-3:6-dioxo-1:2:3:6-tetrahydropyridazine described in Example 3.

In a similar manner 1-phenyl-2-methyl-5-bromo-3:6-dioxo-1:2:3:6-tetrahydropyridazine can be used as starting material.

The 5-halogen compounds used as starting materials are obtained as follows:

5 grams of 1-phenyl-5-chloro-3:6-dioxo-1:2:3:6-tetrahydropyridazine are heated with 20 cc. of dimethyl sulfate for 3½ hours to 120–130° C. The light brown solution is cooled and poured into a saturated sodium carbonate solution (about 150 cc.). After standing for 2 days the alkaline solution is extracted by shaking with chloroform. The dried chloroform solution is filtered through animal charcoal and evaporated. The light yellow, crystalline residue is recrystallized from methanol. In this manner 1-phenyl-2-methyl-5-chloro-3:6-dioxo-1:2:3:6-tetrahydropyridazine is obtained in the form of yellow white crystals of M.P. 156–157.5° C.

26 grams of 1-phenyl-2-methyl-4:5-dibromo-3:6-dioxo-1:2:3:4:5:6-hexahydropyridazine are heated to boiling for 6 hours in 250 cc. of chloroform with 11.4 grams of pyridine. The light yellow solution is washed until acid with 2 N-hydrochloric acid, dried and evaporated. The crystalline residue is recrystallized from benzene/petroleum. In this manner the 1-phenyl-2-methyl-5-bromo-3:6-dioxo-1:2:3:6-tetrahydropyridazine is obtained in the form of weakly yellow crystals of M.P. 159–161° C.

Example 6

10 grams of 1-phenyl-2-methyl-4:5-dibromo-3:6-dioxo-1:2:3:4:5:6-hexahydropyridazine are heated to boiling in 100 cc. of methanol and treated dropwise with a solution consisting of 1.4 grams of sodium in 50–60 cc. of methanol. After 7 hours heating, the methanol is for the most part distilled off and the residue treated with water and then extracted by shaking with chloroform. The dried chloroform solution is evaporated and the yellowish residue recrystallized from ethyl acetate/petroleum ether. In this manner there is obtained the 1-phenyl-2-methyl-4-methoxy-3:6-dioxo-1:2:3:6-tetrahydropyridazine described in Example 3.

The starting material can be obtained in the following manner:

50 grams of 1-phenyl-2-methyl-3:6-dioxo-1:2:3:6-tetrahydropyridazine are dissolved in the hot in 100 cc. of glacial acetic acid and treated with a solution of 39 grams of bromine in 50 cc. of glacial acetic acid. The brown solution is heated for a short time to boiling, as a result of which it becomes decolorized. It is allowed to stand first for 3 hours at room temperature, then for some time longer at 0° C., whereby 1-phenyl-2-methyl-4:5-dibromo-3:6-dioxo-1:2:3:4:5:6-hexahydropyridazine of the formula

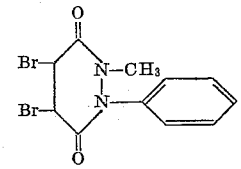

is obtained in the form of white crystals. When recrystallized from absolute ethanol, the product melts with decomposition at 177–178.5° C.

Example 7

10 grams of 1-phenyl-2-methyl-4:5-dibromo-3:6-dioxo-1:2:3:4:5:6-hexahydropyridazine are dissolved in 150 cc. of absolute ethanol on a boiling water bath under reflux and treated with a solution of 1.2 grams of sodium in 65 cc. of absolute ethanol. After heating for 1 hour on the water bath, water is added followed by evaporation to ¼ of the volume. Dilution with water is again carried out and then extraction by shaking with chloroform. The dried chloroform solution is evaporated and the yellow-white oily residue recrystallized from benzene/ether. In this manner 1-phenyl-2-methyl-4-ethoxy-3:6-dioxo-1:2:3:6-tetrahydropyridazine is obtained in white crystals of M.P. 169–171° C.

Example 8

10 grams of 1-phenyl-2-methyl-5-bromo-3:6-dioxo-1:2:3:6-tetrahydro-pyridazine are heated in a tube for 6 hours to 120–130° C. in 160 cc. of absolute ethanol with 8 grams of triethylamine. The brown solution is evaporated, treated with water and rendered acid. The solution is extracted by shaking with chloroform, the organic phase dried and evaporated and the residue crystallized from ethyl acetate. In this manner the 1-phenyl-2-methyl-4-ethoxy-3:6-dioxo-1:2:3:6-tetrahydropyridazine described in Example 7 is obtained.

Example 9

10 grams of 1-phenyl-2-ethyl-5-bromo-3:6-dioxo-1:2:3:6-tetrahydropyridazine are heated to boiling under reflux in 80 cc. of methanol and treated dropwise with a solution of 1 gram of sodium in 70–85 cc. of methanol. After 3 hours heating under reflux the solvent is distilled off and the mixture treated with water. The alkaline solution is extracted by shaking with chloroform, the organic phase dried and evaporated and the yellow residue recrystallized from acetone/petroleum ether. In this manner 1-phenyl-2-ethyl-4-methoxy-3:6-dioxo-1:2:3:6-tetrahydropyridazine is obtained in white crystals of M.P. 110–112° C.

The 1-phenyl-2-ethyl-5-bromo-3:6-dioxo-1:2:3:6-tetrahydropyridazine used as starting material can be obtained as follows:

10 grams of 1-phenyl-2-ethyl-3:6-dioxo-1:2:3:6-tetrahydropyridazine are treated with 47 cc. of a molar solution of bromine in glacial acetic acid. The mixture is heated for a short time to boiling, whereby it becomes decolorized. The whole is then cooled, whereby the brominated product crystallizes out. For purification it is recrystallized from absolute ethanol. In this manner 1-phenyl-2-ethyl-4:5-dibromo - 3:6 - dioxo-1:2:3:4:5:6-hexahydropyridazine is obtained in white crystals of M.P. 176–177° C. (with decomposition).

23.6 grams of 1-phenyl-2-ethyl-4:5-dibromo-3:6-dioxo-1:2:3:4:5:6-hexahydro-pyridazine are heated to boiling for 6 hours in 200 cc. of chloroform with 10 grams of pyridine. The light yellow chloroform solution is washed until acid with dilute hydrochloric acid, dried and evaporated. The crystalline residue is recrystallized from benzene/petroleum ether. In this manner 1-phenyl-2-ethyl-5-bromo-3:6 - dioxo - 1:2:3:6 - tetrahydropyridazine is obtained in weakly yellow crystals of M.P. 142–144° C.

Example 10

12 grams of 1-phenyl - 2 - methyl-5-bromo-3:6-dioxo-1:2:3:6-tetrahydropyridazine in 120 cc. of n-butyl alcohol are heated for 10 hours to 115–125° C. with 8.7 grams of triethylamine. The reddish solution is evaporated under vacuum, whereby triethylamine hydrobromide crystallizes out. The residue is treated with water, rendered acid and extracted by shaking with chloroform. The chloroform solution is washed with dilute caustic soda solution and with water, then dried and completely evaporated. The residue is recrystallized from benzene/petroleum ether. In this manner 1-phenyl-2-methyl-4-n-butoxy - 3:6 - dioxo-1:2:3:6-tetrahydropyridazine is obtained in the form of white crystals of M.P. 116–118° C.

Example 11

15 grams of 1 - phenyl-2-ethyl - 5 - bromo-3:6-dioxo-1:2:3:6-tetrahydropyridazine in 120 cc. of absolute ethanol are heated to boiling for 6 hours with 10.3 grams of triethylamine. The ethanol is distilled off and the reddish residue treated with water, rendered acid and extracted several times with chloroform. The chloroform solution is washed with dilute caustic soda solution and water, then dried and evaporated completely. The crystalline residue is recrystallized from benzene/petroleum ether. In this manner 1-phenyl-2-ethyl - 4 - ethoxy-3:6-dioxo - 1:2:3:6 - tetrahydropyridazine is obtained in the form of white crystals of M.P. 132–133.5° C.

Example 12

12 grams of 1-phenyl-2-methyl - 5 - bromo-3:6-dioxo-1:2:3:6-tetrahydropyridazine in 120 cc. of n-propyl alcohol are heated to boiling for 6 hours with 8.65 grams of triethylamine. The reddish colored solution is treated with water and evaporated under vacuum. The residue is again treated with water, rendered acid and extracted by shaking 3 times with chloroform. The chloroform solution is first washed with dilute caustic soda solution and water, then dried and evaporated completely. The residue is recrystallized from benzene/petroleum ether. In this manner 1-phenyl-2-methyl-4-n-propoxy-3:6-dioxo-1:2:3:6-tetrahydropyridazine is obtained in the form of white crystals of M.P. 144–146° C.

Example 13

14 grams of 1-phenyl-2-methyl - 5 - bromo-3:6-dioxo-1:2:3:6-tetrahydropyridazine are boiled under reflux with 100 cc. of allyl alcohol and 8 cc. of triethylamine for 6 hours. After working up as described in Example 10 and recrystallizing the reaction mixture from acetone there is obtained 1-phenyl-2-methyl-4-allyloxy-3:6-dioxo-1:2:3:6-tetrahydropyridazine in the form of colorless prisms melting at 137.5–138.5° C.

Example 14

14 grams of 1-phenyl-2-methyl - 5 - bromo-3:6-dioxo-1:2:3:6-tetrahydropyridine are boiled under reflux with 50 cc. of methallyl alcohol and 8 cc. of triethylamine for 14 hours. After working up as described in Example 10 the crude 1-phenyl-2-methyl-4-methallyloxy-3:6-dioxo-1:2:3:6-tetrahydropyridazine of the formula

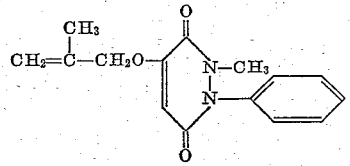

is recrystallized from a mixture of methanol and ether. The product melts at 162–163° C.

Example 15

14 grams of 1-phenyl-2-methyl - 5 - bromo-3:6-dioxo-1:2:3:6-tetrahydropyridazine are boiled under reflux in 100 cc. of benzene with 20 cc. of propargyl alcohol and 8 cc. of triethylamine for 14 hours. After working up as described in Example 10, 1-phenyl-2-methyl-4-propargloxy-3:6-dioxo-1:2:3:6-tetrahydropyridazine of the formula

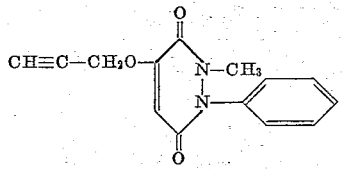

is obtained. When recrystallized several times from ethyl acetate, the product melts at 151.5–152.5° C.

Example 16

14 grams of 1-phenyl-2-methyl - 5 - bromo-3:6-dioxo-1:2:3:6-tetrahydropyridazine are boiled under reflux in 100 cc. of isobutyl alcohol and 8 cc. of triethylamine for 12 hours. After working up in the manner described in Example 10, there is obtained 1-phenyl-2-methyl-4-isobutoxy-3:6-dioxo-1:2:3:6-tetrahydropyridazine of the formula

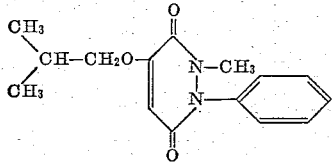

after recrystallization from acetone in the form of colorless lamellae melting at 151–152° C.

Example 17

14 grams of 1-phenyl-2-methyl-5-bromo-3:6-dioxo-1:2:3:6-tetrahydropyridazine are stirred with 50 cc. of 3-methoxy-1-butanol and 8 cc. of triethylamine for 12 hours at 90–100° C. After working up in the manner described in Example 10, there is obtained 1-phenyl-2-methyl-4-(3'-methoxy - 1' - butoxy) 3:6 - dioxo - 1:2:3:6 - tetrahydropyridazine of the formula

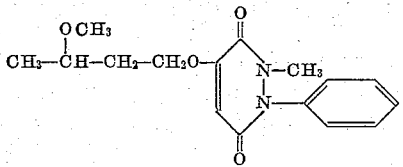

which crystallizes from a mixture of isopropanol and ether in the form of colorless, matted needles melting at 118.5–119.5° C.

Example 18

14 grams of 1-phenyl-2-methyl-5-bromo-3:6-dioxo-

1:2:3:6-tetrahydropyridazine are stirred with 40 cc. of ethylene chlorhydrin and 8 cc. of triethylamine for 12 hours at 90–100° C. The mixture is liberated in vacuo from excess ethylene chlorhydrin and the residue is worked up as described in Example 10. 1-phenyl-2-methyl - 4 - β-chlorethoxy-3:6-dioxo-1:2:3:6-tetrahydropyridazine is recrystallized from methanol. The product melts at 159.5–161.5° C.

*Example 19*

10.5 grams of 1-para-chlorophenyl-2-methyl-5-bromo-3:6-dioxo-1:2:3:6-tetrahydropyridazine are boiled under reflux for 14 hours with 150 cc. of absolute ethyl alcohol with the addition of 9 cc. of triethylamine. After working up in the manner described in Example 10 and recrystallization from isopropanol and ether there is obtained 1 - para-chlorophenyl-2-methyl-4-ethoxy-3:6-dioxo-1:2:3:6-tetrahydropyridazine in the form of colorless crystals melting at 164.5–165.5° C.

The 1-para-chlorophenyl-2-methyl-5-bromo-3:6-dioxo-1:2:3:6-tetrahydropyridazine used as starting material can be prepared as follows:

100 grams of 1-para-chlorophenyl-3-hydroxypyridazone-(6) are heated rapidly to 190–200° C. with 100 cc. of dimethyl sulfate in an oil bath previously heated to 150° C. The pyridazone dissolves slowly. After reaching boiling point, the mixture boils for a short time spontaneously without any external heating. After the reaction has subsided, the mixture is allowed to cool for 15 minutes and is then stirred into 750 cc. of saturated sodium carbonate solution and 750 cc. of water. After stirring overnight at room temperature, the excess dimethyl sulfate is hydrolyzed. The solution is extracted with chloroform, the chloroform extract is washed with dilute sodium hydroxide solution and water, dried and evaporated. The residue is recrystallized from methanol. 1-para-chlorophenyl-2-methyl-3:6-dioxo - 1:2:3:6 - tetrahydropyridazine forms coarse prisms melting at 145–146° C.

100 cc. of a 1-molar solution of bromine in glacial acetic acid are added to 23.65 grams of 1-para-chlorophenyl - 2 - methyl - 3:6 - dioxo - 1:2:3:6 - tetrahydropyridazine dissolved in 30 cc. of hot glacial acetic acid. The solution is heated for a short time at the boil, the solution losing its color. After cooling and letting the mixture stand overnight, the product which has crystallized out is filtered with suction, washed with a little methanol and dried. The 1-para-chlorophenyl-2-methyl-4:5-dibromo-3:6-dioxo-1:2:3:4:5:6-hexahydropyridazine forms colorless crystals melting at 178° C. From the glacial acetic acid mother liquor a small quantity of the same product can be obtained by diluting with water.

21.5 grams of this dibromo-derivative are boiled under reflux for 6 hours in 200 cc. of chloroform with 9 grams of pure pyridine. The chloroform solution is then washed with dilute hydrochloric acid and water, dried and evaporated and the residue recrystallized from methanol. 1-para-chlorophenyl-2-methyl-5-bromo-3:6-dioxo - 1:2:3:6-tetrahydropyridazine forms yellow prisms melting at 158.5–159° C.

*Example 20*

10 grams of 1-para-chlorophenyl-2-methyl-5-bromo-3:6-dioxo-1:2:3:6-tetrahydropyridazine are boiled under reflux for 12 hours with 70 cc. of n-propyl alcohol and 7 cc. of triethylamine. After working up in the manner described in Example 10 and recrystallization from a mixture of isopropanol and ether there is obtained 1-p-chlorophenyl-2-methyl-4-n-propoxy - 3:6 - dioxo - 1:2:3:6-tetrahydropyridazine in the form of colorless crystals melting at 144.5–145.5° C.

*Example 21*

10.5 grams of 1-para-chlorophenyl-2-methyl-5-bromo-3:6-dioxo-1:2:3:6-tetrahydropyridazine are boiled under reflux for 12 hours with 70 cc. of n-butanol with the addition of 7 grams of triethylamine as described in Example 10. After working up as described in Example 10, there is obtained 1-para-chlorophenyl-2-methyl-4-n-butoxy-3:6-dioxo - 1:2:3:6 - tetrahydropyridazine which crystallizes from acetone in the form of white crystals melting at 116–118° C.

*Example 22*

14.75 grams of 1-para-tolyl-2-methyl - 5 - bromo-3:6-dioxo-1:2:3:6-tetrahydropyridazine are boiled under reflux for 20 hours with 100 cc. of absolute ethyl alcohol and 10 cc. of triethylamine. After working up in the manner described in Example 10 and recrystallization from a mixture of isopropanol and ether there is obtained 1-para-tolyl-2-methyl - 4 - ethoxy-3:6-dioxo-1:2:3:6-tetrahydropyridazine in the form of colorless prisms melting at 164–165° C.

The 1-para-tolyl-2-methyl-5-bromo-3:6-dioxo-1:2:3:6-tetrahydropyridazine used as starting material can be prepared as follows:

171 grams of para-tolyl-hydrazine sulfate are boiled under reflux for 2 hours with 1.7 liters of water, 180 cc. of concentrated hydrochloric acid and 98 grams of maleic acid anhydride with stirring. After cooling, the mixture is filtered with suction, the crystallisate is purified by being dissolved in dilute sodium hydroxide solution, filtering the solution with charcoal and precipitating with 5 N-hydrochloric acid. 1-para-tolyl-3-hydroxy-pyridazone-(6) melts at 230° C.

101 grams of 1-para-tolyl-3-hydroxy-pyridazone-(6) are stirred with 150 cc. of dimethyl sulfate for 5 hours at 145–150° C. The mixture is then hydrolyzed overnight with excess dilute sodium carbonate solution. After extraction with ether to remove any byproducts, the mixture is extracted with chloroform and 1-para-tolyl-2-methyl-3:6-dioxo-1:2:3:6-tetrahydropyridazine is obtained which crystallizes from a mixture of acetone and ether in the form of pale yellow crystals melting at 132–134° C.

100 cc. of a 1-molar bromo-glacial acetic acid solution are added to 21.6 grams of this product dissolved in 20 cc. of hot glacial acetic acid. After boiling for a short time, the solution loses its color. It is poured hot on to ice, the precipitating bromination product is filtered with suction, washed with water, dissolved in chloroform, the solution (350 cc.) dried and after the addition of 16 cc. of pure pyridine the whole is boiled under reflux for 6 hours. The chloroform solution is then washed neutral with dilute hydrochloric acid and water, dried, evaporated and the residue recrystallized from methanol. 1-para - tolyl - 2 - methyl - 5 - bromo - 3:6 - dioxo-1:2:3:6-tetrahydropyridazine forms pale yellow prisms melting at 170–171° C.

*Example 23*

14.75 grams of 1-para-tolyl-2-methyl-5-bromo-3:6-dioxo-1:2:3:6-tetrahydropyridazine are boiled under reflux for 20 hours with 100 cc. of n-propyl alcohol with the addition of 10 cc. of triethylamine. After working up as described in Example 10 there is obtained 1-para-tolyl - 2 - methyl - 4 - n - propoxy - 3:6 - dioxo - 1:2:3:6-tetrahydropyridazine which when recrystallized from a mixture of isopropanol and ether melts at 157–157.5° C.

*Example 24*

9.83 grams of 1-para-tolyl-2-methyl-5-bromo-3:6-dioxo-1:2:3:6-tetrahydropyridazine are boiled under reflux for 12 hours with 80 cc. of n-butanol and 9 cc. of triethylamine. After working up as described in Example 10 there is obtained 1-para-tolyl-2-methyl-4-n-butoxy-3:6-dioxo - 1:2:3:6 - tetrahydropyridazine which crystallizes from a mixture of methylethylketone and ether in the form of colorless, lustrous lamellae melting at 133–133.5° C.

*Example 25*

10.5 grams of 1-meta-chlorophenyl-2-methyl-5-bromo-3:6-dioxo-1:2:3:6-tetrahydropyridazine are boiled under reflux for 14 hours with 150 cc. of absolute ethyl alcohol and 9 cc. of triethylamine. After working up as described in Example 10 there is obtained 1-meta-chlorophenyl - 2 - methyl - 4 - ethoxy - 3:6 - dioxo - 1:2:3:6- tetrahydropyridazine. The product crystallizes from isopropanol in the form of colorless crystals melting at 179–180° C.

The 1 - meta - chlorophenyl - 2- methyl - 5 - bromo-3:6-dioxo-1:2:3:6-tetrahydropyridazine used as starting material can be prepared as follows:

273 grams of meta-chlorophenyl-hydrazine sulfate are boiled under reflux for 2 hours with 1.7 liters of water, 180 cc. of concentrated hydrochloric acid (d=1.19) and 98 grams of maleic acid anhydride with stirring. After cooling, the crystalline product is filtered with suction, washed with water and, for the purpose of purification, dissolved once more in 700 cc. of 2 N-sodium hydroxide solution. The alkaline solution is filtered through Celite with active charcoal and the reaction product is then precipitated with stirring by adding 5 N-hydrochloric acid dropwise. The colorless 1-meta-chlorophenyl-3-hydroxy-pyridazone-(6) is filtered with suction, washed neutral with water and dried under reduced pressure at 110° C. It melts at 247–248° C.

11.25 grams of 1-meta-chlorophenyl-3-hydroxy-pyridazone-(6) are stirred for 4 hours at a bath temperature of 150–155° C. with 150 cc. of dimethyl sulfate. After cooling, the mixture is stirred overnight at room temperature with 850 cc. of saturated sodium carbonate solution and 750 cc. of water. The homogeneous solution is extracted 4 times with ether to remove O-methyl derivative.

The solution is then extracted 4 times with chloroform. After distilling off the chloroform, the crystalline residue is recrystallized from methanol. 1-meta-chlorophenyl-2-methyl-3:6-dioxo-1:2:3:6-tetrahydropyridazine melts at 141–142° C.

69.4 grams of 1-meta-chlorophenyl-2-methyl-3:6-dioxo-1:2:3:6-tetrahydropyridazine are dissolved in 100 cc. of hot glacial acetic acid and added to 294 cc. of a 1-molar solution of bromine in glacial acetic acid. The mixture is boiled for a short time, the bromine being rapidly consumed. The mixture is then poured on to ice, the precipitated dibromo-derivative filtered with suction, washed with water, dissolved in chloroform, the solution washed with water, dried with sodium sulfate and diluted with chloroform to make up 400 cc. After adding 47 cc. of pure pyridine, the mixture is boiled under reflux for 6 hours, the chloroform solution washed with dilute hydrochloric acid and water, dried and evaporated. The residue is recrystallized from methanol. 1-meta-chlorophenyl - 2 - methyl - 5 - bromo - 3:6 - dioxo - 1:2:3:6- tetrahydropyridazine melts at 169–170° C.

*Example 26*

10.5 grams of 1-meta-chlorophenyl-2-methyl-5-bromo-3:6-dioxo-1:2:3:6-tetrahydropyridazine are boiled under reflux for 12 hours with 70 cc. of n-propyl alcohol and 7 cc. of triethylamine. After working up as described in Example 10 and crystallizing the reaction product from isopropanol there is obtained 1-meta-chlorophenyl-2-methyl - 4 - n - propoxy - 3:6-dioxo - 1:2:3:6 - tetrahydropyridazine in the form of colorless crystals melting at 139–140° C.

*Example 27*

12 grams of 1-phenyl-2-methyl-5-bromo-3:6-dioxo-1:2:3:6-tetrahydropyridazine in 100 cc. of 2-ethoxyethanol are heated for 6 hours at 125–135° C. with 8.7 grams of triethylamine. The product is worked up as described in Example 10. There is obtained 1-phenyl-2-methyl - 4 - (2' - ethoxy - ethoxy) - 3:6 - dioxo - 1:2:3:6-tetrahydropyridazine. When recrystallized from a mixture of ethyl acetate and petroleum ether the product forms white crystals melting at 106–107° C.

*Example 28*

12 grams of 1-phenyl-2-ethyl-5-bromo-3:6-dioxo-1:2:3:6-tetrahydropyridazine in 100 cc. of 2-methoxy-ethanol are heated for 6 hours at 115–125° C. with 8.2 grams of triethylamine. The mixture product is worked up as described in Example 10. After recrystallization from a mixture of benzene and petroleum ether there is obtained 1 - phenyl - 2 - ethyl - 4 - (2' - methoxy-ethoxy)- 3:6-dioxo-1:2:3:6-tetrahydropyridazine in the form of white crystals melting at 120–121° C.

*Example 29*

8.6 grams of triethylamine are added to 24 grams of 1 - phenyl - 2 - methyl - 5 - bromo - 3:6 - dioxo - 1:2:3:6-tetrahydropyridazine in 600 cc. of benzene. 34.8 cc. of a solution of ethyl mercaptan in benzene of 16.6% strength by volume is added dropwise at room temperature. The temperature increases slightly, the solution is then heated for a short time to 40–45° C., all the starting material dissolving. After stirring for several hours, the benzene solution is washed first with dilute hydrochloric acid, then with dilute sodium hydroxide solution and water. The dried organic phase is completely evaporated and the crystalline residue recrystallized from a mixture of ethyl acetate and petroleum ether. There is obtained 1 - phenyl - 2 - methyl - 4 - ethylmercapto-3:6-dioxo-1:2:3:6-tetrahydropyridazine in the form of faintly yellow crystals melting at 133–135° C.

*Example 30*

12 grams of 1-phenyl-2-ethyl-5-bromo-3:6-dioxo-1:2:3:6-tetrahydropyridazine in 120 cc. of n-butyl alcohol are boiled under reflux for 10 hours with 8.2 grams of triethylamine. Working up is as described in Example 10. After recrystallization from hexane there is obtained 1 - phenyl - 2 - ethyl - 4 - n - butoxy - 3:6 - dioxo-1:2:3:6-tetrahydropyridazine in the form of white crystals melting at 91.5–93° C.

*Example 31*

12 grams of 1-phenyl-2-methyl-5-bromo-3:6-dioxo-1:2:3:6-tetrahydropyridazine in 70 cc. of n-hexyl alcohol are heated for 6 hours at 120–130° C. with 8.7 grams of triethylamine. Working up is as described in Example 10. After recrystallization from a mixture of benzene and petroleum ether there is obtained 1-phenyl-2-methyl-4-n-hexyloxy-3:6-dioxo-1:2:3:6-tetrahydropyridazine in the form of white crystals melting at 109.5–111° C.

*Example 32*

13.1 grams of crude 1-ortho-chlorophenyl-2-methyl-5-bromo-3:6-dioxo-1:2:3:6-tetrahydropyridazine in 100 cc. of n-butyl alcohol are heated for 10 hours at 115–125° C. with 8.3 grams of triethylamine. Working up is as described in Example 10. After distilling the product twice in a bulb tube (boiling point 200° C. under 0.025 mm. pressure) and recrystallizing the distillate from a mixture of acetone and petroleum ether there is obtained 1 - ortho - chlorophenyl - 2 - methyl - 4 - n - butoxy-3:6-dioxo-1:2:3:6-tetrahydropyridazine in the form of white crystals melting at (120.5) 122–123° C.

The 1 - ortho - chlorophenyl - 2 - methyl - 5 - bromo-

3:6-dioxo-1:2:3:6-tetrahydropyridazine used as starting material can be prepared as follows:

30 grams of 1-ortho-chlorophenyl-3:6-dioxo-1:2:3:6-tetrahydropyridazine are heated for 20 minutes at 190–200° C. in 50 cc. of dimethyl sulfate in an oil bath previously heated to 150° C. The brown solution is cooled and poured into 300 cc. of saturated sodium carbonate solution and 250 cc. of water. After stirring for several hours the solution is extracted with chloroform, the organic phase dried, filtered and evaporated. The residue is recrystallized from a mixture of benzene and petroleum ether. There is obtained 1-ortho-chlorophenyl-2-methyl-3:6-dioxo-1:2:3:6-tetrahydropyridazine melting at 107–108° C.

55 cc. of a molar solution of bromine in glacial acetic acid are added to 13 grams of 1-ortho-chlorophenyl-2-methyl-3:6-dioxo-1:2:3:6-tetrahydropyridazine. The mixture is heated at the boil for a short time, whereby it loses it color. The solution is cooled and the crystalline product filtered with suction and recrystallized from absolute ethanol. There is obtained 1-ortho-chlorophenyl-2 - methyl - 4:5 - dibromo - 3:6 - dioxo - 1:2:3:4:5:6-hexahydropyridazine in the form of white crystals melting at (170) 171–173° C.

15 grams of 1-ortho-chlorophenyl-2-methyl-4:5-dibromo - 3:6 - dioxo - 1:2:3:4:5:6 - hexahydropyridazine are heated for 6 hours at the boil in 150 cc. of chloroform with 6 grams of pyridine. The yellow chloroform solution is washed with dilute hydrochloric acid and water, dried and evaporated. There is obtained 1-ortho-chlorophenyl- - 2 - methyl - 5 - bromo - 3:6 - dioxo - 1:2:3:6-tetrahydropyridazine in the form of a yellow resin which can be used directly for the reaction described above.

*Example 33*

8 grams of 1-phenyl-2-methyl-5-bromo-3:6-dioxo-1:2:3:6-tetrahydropyridazine in 50 cc. of distilled ethanolamine are heated for 10 hours at 120–130° C. with 5.8 grams of triethylamine. The solution is completely evaporated under reduced pressure, water is added to the residue which is rendered acid with dilute hydrochloric acid and extracted with chloroform. The aqueous acid solution is saturated with potassium carbonate and extracted several times with chloroform. The dried organic phase is evaporated and the crystalline residue recrystallized from a mixture of ethyl acetate, ethanol and petroleum ether. There is obtained 1-phenyl-2-methyl-4-(2'-aminoethoxy)-3:6-dioxo-1:2:3:6-tetrahydropyridazine in the form of white crystals melting at 164–166° C.

*Example 34*

12 grams of 1-phenyl-2-methyl-5-bromo-3:6-dioxo-1:2:3:6-tetrahydropyridazine in 100 cc. of n-amyl alcohol are heated for 10 hours at 120–130° C. with 8.7 grams of triethylamine. Working up is as described in Example 10. After recrystallizing the product from a mixture of benzene and petroleum ether there is obtained 1-phenyl-2-methyl - 4 - n - amyloxy - 3:6 - dioxo - 1:2:3:6 - tetrahydropyridazine in the form of white crystals melting at 113–115° C.

*Example 35*

15 grams of 1-phenyl-2-methyl-5-bromo-3:6-dioxo-1:2:3:6-tetrahydropyridazine in 100 cc. of benzyl alcohol are heated for 10 hours at 120–130° C. with 12.5 grams of triethylamine. The product is worked up as described in Example 10. After recrystallizing the reaction product from methanol there is obtained 1-phenyl-2-methyl-4-benzyloxy-3:6-dioxo-1:2:3:6-tetrahydropyridazine in the form of white crystals melting at 214–215° C.

*Example 36*

24.0 grams of 1-phenyl-2-methyl-5-bromo-3:6-dioxo-1:2:3:6-tetrahydropyridazine in 120 cc. of ethylene glycol are heated for 15 hours at 120–130° C. with 17.4 grams of triethylamine. The solution is completely evaporated under reduced pressure, water is added to the residue, the latter is rendered acid with dilute hydrochloric acid and extracted four times with ethyl acetate. The aqueous solution is extracted four times with chloroform. The dried chloroform solution is completely evaporated, the residue is dissolved in a mixture of ethyl acetate and methanol with heating, and the methanol is distilled off. From the cooled ethyl acetate solution 1-phenyl-2-methyl-4-β-hydroxy - ethoxy - 3:6-dioxo - 1:2:3:6 - tetrahydropyridazine crystallizes. It has a melting point of 171–173° C.

*Example 37*

12 grams of 1-phenyl-2-methyl-5-bromo-3:6-dioxo-1:2:3:6-tetrahydropyridazine in 100 cc. of distilled isopropyl alcohol are heated in a tube for 10 hours at 160–170° C. with 8.7 grams of triethylamine. Water is added to the contents of the tube, and the solution is extracted with chloroform and the dried organic phase evaporated. Dilute hydrochloric acid is added to the residue, and the solution is extracted again with chloroform. The dried chloroform solution is evaporated again and the residue is first distilled in a bulb tube (boiling point 200° C. under 0.04 mm. of pressure), then recrystallized from a mixture of acetone and petroleum ether. There is obtained 1-phenyl - 2 - methyl - 4 - isopropoxy - 3:6 - dioxo - 1:2:3:6-tetrahydropyridazine in the form of white crystals melting at 158–160° C.

What is claimed is:
1. 1 - phenyl - 2 - methyl - 4 - ethoxy - 3:6 - dioxo-1:2:3:6-tetrahydropyridazine.
2. 1 - phenyl - 2 - methyl - 4 - n - propoxy - 3:6 - dioxo-1:2:3:6-tetrahydropyridazine.
3. 1 - phenyl - 2 - methyl - 4 - n - butoxy - 3:6 - dioxo-1:2:3:6-tetrahydropyridazine.
4. 1 - phenyl - 2 - ethyl - 4 - n - butoxy - 3:6 - dioxo-1:2:3:6-tetrahydropyridazine.
5. 1 - p - chlorophenyl - 2 - methyl - 4 - n - butoxy - 3:6-dioxo-1:2:3:6-tetrahydropyridazine.
6. 1 - p - chlorophenyl - 2 - methyl - 4 - n - propoxy-3:6-dioxo-1:2:3:6-tetrahydropyridazine.
7. 1 - p - tolyl - 2 - methyl - 4 - n - propoxy - 3:6 - dioxo-1:2:3:6-tetrahydropyridazine.
8. A member selected from the group consisting of 3,6 dioxo-1,2,3,6-tetrahydro-pyridazines of the formula

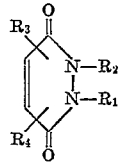

wherein $R_1$ represents a member of the group consisting of phenyl, lower alkyl-phenyl, lower alkoxy-phenyl, halophenyl, nitro-phenyl and amino-phenyl, $R_2$ stands for lower alkyl, $R_3$ is a member of the group consisting of hydrogen and lower alkyl and $R_4$ stands for a member selected from the group consisting of lower alkoxy, lower alkenyloxy, propargyloxy, lower alkoxy-lower alkoxy, halogeno-lower alkoxy, amino-lower alkoxy, lower alkyl-amino-lower alkoxy, di-lower alkyl-amino-lower alkoxy, morpholino-lower alkoxy, pyrrolidino-lower alkoxy, piperidino-lower alkoxy, piperazino-lower alkoxy, N-methyl-piperazino-lower alkoxy, N-(β-hydroxy-ethyl)-piperazino-lower alkoxy, benzyloxy, hydroxy-lower alkoxy and lower alkyl-mercapto, and therapeutically useful acid-addition salts of compounds in which $R_4$ contains an amino nitrogen group.

9. 3,6-dioxo-1,2,3,6-tetrahydro-pyridazines, shown in claim 8, wherein $R_1$ stands for phenyl, $R_2$ for lower alkyl, $R_3$ for hydrogen and $R_4$ represents lower alkoxy.

10. 3,6-dioxo-1,2,3,6-tetrahydro-pyridazines shown in claim 8, wherein $R_1$ stands for phenyl, $R_2$ for lower alkyl, $R_3$ for hydrogen and $R_4$ represents lower alkoxy-lower alkoxy.

11. 3,6-dioxo-1,2,3,6-tetrahydro-pyridazines, shown in claim 8, wherein $R_1$ stands for phenyl, $R_2$ for lower alkyl, $R_3$ for hydrogen and $R_4$ represents lower alkenyloxy.

12. 3,6-dioxo-1,2,3,6-tetrahydro-pyridazines, shown in claim 8, wherein $R_1$ stands for halophenyl, $R_2$ for lower alkyl, $R_3$ for hydrogen and $R_4$ represents lower alkoxy.

13. 3,6-dioxo-1,2,3,6-tetrahydro-pyridazines shown in claim 8, wherein $R_1$ stands for halophenyl, $R_2$ for lower alkyl, $R_3$ for hydrogen and $R_4$ represents lower alkoxy-lower alkoxy.

14. 3,6-dioxo-1,2,3,6-tetrahydro-pyridazines, shown in claim 8, wherein $R_1$ stands for halophenyl, $R_2$ for lower alkyl, $R_3$ for hydrogen and $R_4$ represents lower alkenyloxy.

No references cited.

UNITED STATES PATENT OFFICE
CERTIFICATE OF CORRECTION

Patent No. 3,004,973                  October 17, 1961

Jean Druey et al.

It is hereby certified that error appears in the above numbered patent requiring correction and that the said Letters Patent should read as corrected below.

Column 5, lines 70 and 71, after "petroleum" insert -- ether --; column 11, line 36, for "11.25" read -- 111.25 --.

Signed and sealed this 3rd day of July 1962.

(SEAL)
Attest:

ERNEST W. SWIDER                  DAVID L. LADD
Attesting Officer                  Commissioner of Patents